June 1, 1954

J. D. BICK

FREQUENCY DIVIDER

Filed Oct. 30, 1951

2,680,198

INVENTOR
John D. Bick
BY Morris A. Rabkin
ATTORNEY

Patented June 1, 1954

2,680,198

UNITED STATES PATENT OFFICE 2,680,198

FREQUENCY DIVIDER

John D. Bick, Moorestown, N. J., assignor to Radio Corporation of America, a corporation of Delaware Application October 30, 1951, Serial No. 253,868

12 Claims. (Cl. 250—36)

Figure 1:
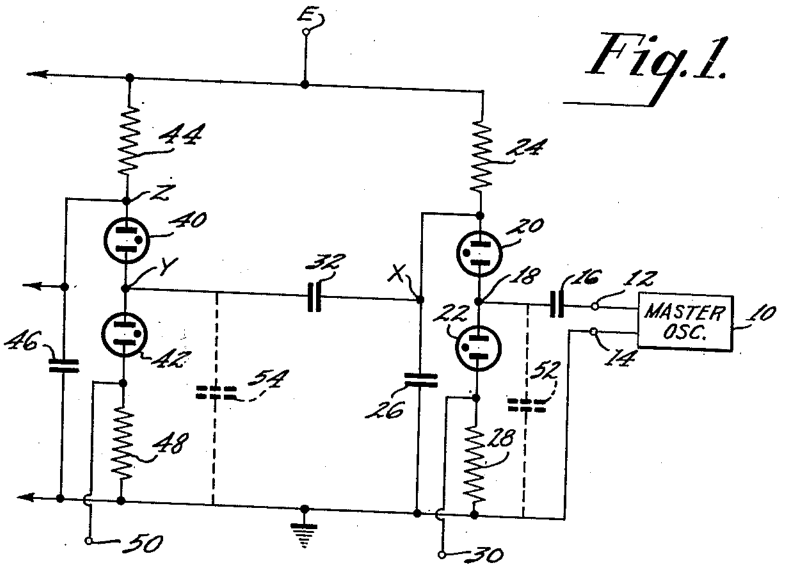

This invention relates broadly to frequency dividers of the type employing gaseous discharge tubes, and specifically to a stable and inexpensive system for dividing audio frequencies into octave cascades. The invention is of particular importance in electrical musical instruments, although its utility is not confined thereto.

To produce the notes of some electrical musical instruments, a master oscillator is used to generate a fundamental frequency, and frequency divider circuits are employed to divide the fundamental frequency into submultiples thereof. In this manner, it is possible, for instance, to divide a fundamental audio frequency into octave cascades by coupling a master oscillator to a cascade of frequency divider circuits so that the output voltage frequency of any divider circuit in said cascade is one-half of the triggering input voltage frequency of the preceding divider circuit.

In order to control a simple frequency divider of the relaxation oscillator type, using twin-element, gaseous discharge tubes, by another similar relaxation oscillator, it is necessary to provide isolation in the circuit so that the controlled oscillator does not feed back a voltage to the controlling oscillator. If feedback were to occur, each oscillator would tend to control the other and, in a chain of oscillators or frequency dividers, control of the chain would no longer be obtained from the master oscillator. Isolation in the control circuit has been obtained in practice, by the use of a vacuum tube as a buffer amplifier, or a transformer connected so that the ratio of the forward control voltage to the backward control voltage is high. Where a low-cost divider system is desired, however, apparatus using vacuum tubes and transformers for coupling is undesirable because of the relative high cost of the components therein. Direct coupling of one frequency divider to another has proved generally unsatisfactory because of the poor frequency stability resulting from the feedback of one frequency divider circuit upon another.

It is, therefore, a general object of this invention to provide an improved, low-cost, frequency divider using glow discharge tubes of the twin-element type and improved means for coupling said frequency divider to other similar frequency dividers with sufficient isolation to prevent feedback and thereby to produce maximum frequency stability.

Another object of the invention is to provide highly stable and economical frequency dividers and coupling means therefor without the use of vacuum tubes or transformers.

A further object of this invention is to provide inexpensive frequency divider means having a range of frequency stability large enough so that a vibrato, or any frequency modulation, imparted to a master oscillator will be faithfully followed by said frequency divider means coupled to the master oscillator.

Still a further object of this invention is to provide an improved, inexpensive and stable submultiple frequency generating system for dividing audio frequencies into harmonically related octave cascades.

In accordance with the invention, the foregoing and other related objects and advantages are attained in a frequency divider system employing high impedance means to couple successive frequency dividers of similar design, but of successively lower natural frequencies so that the frequency divider having the higher frequency controls the frequency divider having the lower frequency. The triggering voltage supplied to a frequency divider of lower frequency, from the preceding frequency divider of higher frequency, is injected through a high impedance element to a point of high impedance. The point of high impedance is a common junction of two glow lamps forming part of the frequency divider circuit. When the glow lamps are not conducting, they present a very high impedance. Thus the control circuit isolation is accomplished by feeding the desired or forward control voltage from a low impedance source in a first frequency divider circuit to a high impedance control point in a second frequency divider circuit through a high impedance coupling path. The transmission of a large amount of desired control voltage, therefore, is permitted from a preceding frequency divider to an adjacent succeeding frequency divider and the transmission of the undesired feedback in the reverse direction is substantially prevented. By this circuit arrangement, the degree of control of the frequency divider of higher frequency over the frequency divider of lower frequency is very great, and the degree of control of the latter over the former is negligible. Successive frequency dividers are, therefore, isolated from each other as far as control is concerned, and undesirable feedback is eliminated. In this manner, a high degree of frequency stability is obtained.

A more complete understanding of the invention can be had by reference to the following description of an illustrative embodiment thereof, when considered in connection with the accompanying drawing wherein:

Fig. 1 is a schematic diagram of a frequency divider system in accordance with the invention, and Figs. 2*a*, 2*b*, 2*c*, 2*d*, 2*e* and 2*f* are voltage wave forms used to explain the operation of the system of Fig. 1.

Referring to Fig. 1, there is shown a frequency divider system in accordance with the invention for providing an output in the form of pulses whose repetition rate is an integral submultiple of the applied pulses. This system includes a master oscillator 10 of any suitable type for providing a source of alternating voltage of very stable frequency. The voltage output of the master oscillator 10 is used to trigger a first frequency divider which, in turn, will trigger a second frequency divider which, in turn, will trigger a succeeding frequency divider connected thereto in cascade, and so on. In this manner, it is possible to produce an octave cascade in which the output voltage frequency of each frequency divider is one-half of the frequency of the triggering input voltage frequency.

The voltage output of the master oscillator 10, at the output terminals 12 and 14 thereof, is coupled to a first frequency divider circuit through a high impedance coupling capacitor 16. The output terminal 14 is grounded, and the output terminal 12 is connected through the coupling capacitor 16 to a common junction 18 between two serially connected gaseous tubes or lamps 20, 22 of the twin-element, glow discharge type, in the first frequency divider circuit.

The first frequency divider circuit comprises a charging resistor 24, a charging capacitor 26, the tubes 20, 22, and output impedance or resistor 28 connected to function as a relaxation oscillator. The resistor 24 is connected to ground through the capacitor 26. The capacitor 26 is shunted across the series circuit comprising the tubes 20, 22 and the resistor 28. A regulated source of unidirectional potential E, which is greater than the striking potential of the two tubes 20, 22 in series, is applied across the resistor 24 and the capacitor 26. An output terminal 30 of the first frequency divider is connected to the common junction between the tube 22 and the resistor 28. The reason for employing the two tubes 20, 22 in series will be explained hereinafter.

The first frequency divider circuit is coupled to a second frequency divider circuit through a high impedance coupling capacitor 32. One side of the capacitor 32 is connected to a point X between the resistor 24 and the capacitor 26 of the first frequency divider circuit and the other side of the capacitor 32 is connected to a point Y, the common junction between two gaseous tubes 40, 42 of the twin-element type, connected in series in the second frequency divider circuit.

The second frequency divider comprises a charging resistor 44, a charging capacitor 46, the tubes 40, 42, and an output impedance or resistor 48 connected in the same manner as the corresponding elements of the first frequency divider so as to function as a relaxation oscillator. An output terminal 50 of the second frequency divider is connected to the common junction between the tube 42 and the resistor 48. The only differences between the first frequency divider and the second frequency divider are in the capacitances of their respective charging condensers 26, 46. The capacitance of the charging capacitor 46, for instance, is adjusted to a value that will allow the second frequency divider to oscillate at a natural rate which is anywhere from one-third to one-half of the locked frequency of oscillation of the first frequency divider.

A number of similar frequency dividers may be coupled together in cascade in the manner described to produce an octave cascade for use in an electrical musical instrument.

The coupling capacitor 16 is of the same order of magnitude as the total stray capacitance between the junction 18 and ground, as represented by a capacitor 52. The coupling capacitor 32 is, likewise, of the same order of magnitude as the total stray capacitance between the junction Y and ground, as represented by a capacitor 54. The stray capacitances 52 and 54 are caused mainly by the elements of the tubes and their socket connections and are approximately equal to each other. It will now be observed that the capacitors 16 and 52 form a voltage divider across the output of the master oscillator 10; and the capacitors 32 and 54 form a voltage divider across the charging capacitor 26 of the first frequency divider.

Figure 2A:
Figure 2B:
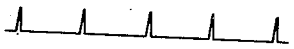

The operation of the frequency divider system is as follows: Without any control voltage from the master oscillator 10, the first frequency divider will oscillate at a nautral rate determined by the constants of the charging circuit, comprising the resistor 24 and the capacitor 26, and the difference between the extinguishing and the striking potentials of the tubes 20, 22 in series. The theory and operation of this type of relaxation oscillator is described in the book, "Theory and Application of Electron Tubes," by H. J. Reich, pages 454–7, second edition, 1944. When a control triggering voltage of suitable amplitude, such as is produced by the master oscillator 10, is fed to the first frequency divider through the capacitor 16, the frequency of the first frequency divider will be locked at the nearest submultiple of the control voltage above its natural frequency. Assume that the first frequency divider is now controlled by the frequency of the master oscillator. The voltage wave at the point X will have the form as shown in Fig. 2*a*; and the voltage wave at the output terminal 30 of the first frequency divider, caused by the firing of the tubes 20, 22, will have the form as shown in Fig. 2*b*.

Figure 2C:
Figure 2D:
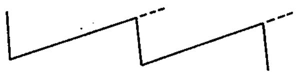
Figure 2E:
Figure 2F:

Since the coupling capacitor 32 has the same capacitance as the strap capacitance 54 between the point Y and ground, the voltage across the capacitor 26 is divided in half at the point Y so that the voltage at the point Y will have the form shown in Fig. 2*c*. Assume, further, that the constants of the second frequency divider are such as to cause it to oscillate at a natural frequency between one-third and one-half of the locked frequency divider. The voltage wave at the point Z, the common junction between the resistor 44 and the capacitor 46, will have the form shown in Fig. 2*d*. The voltage at the point Y will cause a potential difference across the tube 40 which is the difference between the voltage at the point Y and the voltage at the point Z. This potential difference will have the wave form shown in Fig. 2*e*. If the natural frequency of oscillation of the second frequency divider is between one-third and one-half the control voltage frequency at the point X, then the frequency of the second frequency divider will lock into the control voltage at exactly one-half the frequency of the control voltage frequency and produce an output voltage at the terminal 50 which will have the form as shown in Fig. 2*f*.

Since the first frequency divider is coupled through the capacitor 32 to the second frequency divider at the point Y, the second frequency divider is substantially isolated from the first frequency divider. This follows from the fact that the tubes 40, 42 present a very high impedance when they are not firing. When the tubes 40, 42 are firing, any feedback voltage that may be generated at the point Y will be divided through the coupling capacitor 32 and the charging capacitor 26. Since the capacitance of the coupling capacitor 32 can be made very much smaller than the capacitance of the charging capacitor 26, practically all of the feedback voltage generated at the point Y, by the second frequency divider, is attenuated by the relatively smaller coupling capacitor 32.

Although the present invention has been described in connection with the preferred embodiment of Fig. 1, many variations and modifications may be resorted to by those skilled in the art without departing from the principles of the present invention. Thus, Fig. 1 is merely illustrative of the inventive concept of coupling a preceding frequency divider to a succeeding frequency divider in such a manner as to prevent an undesirable feedback from the latter from affecting the former. For the sake of economy and convenience, the output terminal 30, for instance, has been connected to the junction between the resistor 28 and the adjacent tube 22. It is well known in the art, however, that the resistor 28 may be shorted out and that the output terminal 30 may be coupled directly or indirectly to other portions of the relaxation oscillator circuit as, for example, to a suitably tapped point on the charging resistor 24. It is also well known in the art that the relaxation oscillators would function satisfactorily as frequency dividers if the terminals of each charging capacitor were connected across the charging resistor rather than across the serially connected tubes.

There has been shown and described herein, in accordance with the objects of this invention, a system of cascaded frequency dividing devices each comprising two tubes in series, and high impedance means for successively coupling a preceding frequency dividing device to a successive frequency dividing device. The high impedance coupling means has one terminal connected to the junction formed by the charging resistor and charging capacitor of a preceding frequency divider and another terminal connected to the common junction between two serially connected tubes of an adjacent, succeeding frequency divider. The advantages of this system are that (1) undesirable feedback is eliminated by the high impedance coupling means, and (2) the need for relatively expensive vacuum tubes or transformers for coupling purposes, are thus eliminated. The tubes used may be of the relatively inexpensive, twin-element, neon, glow tube variety, thus making possible an inexpensive means for producing a series of octave cascades for use in an inexpensive musical instrument. The tolerances of the elements of each frequency divider can be large because each divider will lock into a frequency of one-half of the triggering voltage pulses if its natural frequency is between one-third and one-half of the triggering frequency. This construction results in a low-cost, highly stable frequency divider system wherein a vibrato, or frequency modulation, imparted to a master oscillator will be faithfully followed by the frequency dividers directly and indirectly coupled thereto.

Although a two octave cascade of dividers has been shown and described in this specification, in the interest of clarity, the following values are provided to illustrate an operative embodiment for an eight octave cascade. These values are merely illustrative and are not to be construed as any limitation on the invention.

| Frequency Divider | Frequency | Charging Capacitors 26, 46, etc. |
|---|---|---|
| First | 3,520 | 100 mmfd. |
| Second | 1,760 | 200 mmfd. |
| Third | 880 | 500 mmfd. |
| Fourth | 440 | .001 mfd. |
| Fifth | 220 | .002 mfd. |
| Sixth | 110 | .005 mfd. |
| Seventh | 55 | .010 mfd. |
| Eighth | 27.5 | .020 mfd. |

Each of the frequency dividers may employ NE-51 type tubes, a charging resistor (e. g., 24, 44) of 3.3 megohms, and an output resistor (e. g., 28, 48) of 10,000 ohms. E, the regulated, unidirectional voltage source, is +180 volts. The coupling capacitors (e. g., 12, 32) are 3-30 mmfd. variable trimmers thereby permitting a convenient method of adjustment to make up for variations in stray shunt capacitance or for wide tolerances in the charging circuit components. In practice, the variable coupling capacitors can be adjusted for the middle of the range of stable division by two.

What is claimed is:

1. In a frequency divider system, a frequency divider comprising two, twin-element, gaseous discharge tubes connected in series and having a common junction therebetween, a charging resistor connected to one of said tubes, an output impedance connected to the other of said tubes, a charging capacitor connected in series with said charging resistor and across said tubes and output impedance, means for applying across said charging resistor and charging capacitor a source of constant potential greater than the striking potential of said two tubes in series, a master oscillator having two output terminals, and a coupling capacitor connected between one of said terminals and said common junction, the other of said terminals being connected to said output impedance.

2. A frequency divider system as defined in claim 1 in which the capacitance of said coupling capacitor has a value substantially equal to the stray capacitance across the circuit comprising said output impedance and said other tube connected thereto.

3. A frequency divider system as defined in claim 1 in which said frequency divider has an output terminal between said output impedance and said other tube for withdrawing oscillatory energy of stabilized frequency from said frequency divider.

4. In a frequency divider system wherein a frequency from a master oscillator is divided into a series of octave cascades, a plurality of relaxation oscillators connected in cascade, each of said relaxation oscillators comprising a pair of twin-element, gaseous discharge tubes connected in series and having a common junction therebetween, a charging resistor connected in series with one of said tubes, an output impedance connected in series with the other of said tubes, a charging capacitor connected across said tubes and said output impedance, means for applying a source of constant potential to all of said relaxation oscillators whereby each of said relaxation oscillators will produce oscillations of a frequency which is between one-third and one-half of a submultiple of the frequency of said master oscillator, and high impedance coupling means between successive relaxation oscillators in said cascade.

5. A frequency divider system according to claim 4 in which said high impedance coupling means is a capacitor of relatively much smaller capacitance than the capacitance of said charging capacitor.

6. A frequency divider system according to claim 4 in which said high impedance coupling means comprises a coupling capacitor having one side connected between said charging resistor and said charging capacitor of a preceding relaxation oscillator and the other side thereof connected to said common junction between said pair of tubes of a succeeding relaxation oscillator.

7. A frequency divider system according to claim 6 in which the capacitance of said coupling capacitor is substantially equal to the stray capacitance of the circuit across the output impedance and said other tube connected thereto in said succeeding relaxation oscillator.

8. A frequency divider system according to claim 6 in which each of said relaxation oscillators has an output terminal between its said output impedance and said other tube for withdrawing oscillatory energy of stabilized frequency from each of said relaxation oscillators.

9. In a submultiple frequency generating system, a cascaded series of harmonically related frequency dividers each comprising a charging capacitor, means for periodically charging said capacitor and means for periodically discharging said capacitor, said discharging means comprising a pair of serially connected twin-element tubes having a common junction therebetween, and high impedance means to couple the charge on the charging capacitor of a preceding divider in said series to said common junction of said pair of serially connected tubes in a succeeding adjacent divider in said series.

10. A submultiple frequency generating system according to claim 9 in which said high impedance means is a coupling capacitor having a capacitance substantially equal to the stray capacitance of the circuit across one of said tubes.

11. A submultiple frequency generating system according to claim 9 in which said high impedance means comprises a coupling capacitor of relatively much smaller capacitance than the capacitance of said charging capacitor of said preceding divider.

12. A submultiple frequency generating system according to claim 9 in which each of said frequency dividers has an output impedance in series with one of said tubes, and an output terminal at the junction of said output impedance and said one of said tubes for withdrawing oscillatory energy of a stabilized frequency.

References Cited in the file of this patent

UNITED STATES PATENTS

| Number | Name | Date |
|---|---|---|
| 2,365,567 | Langer | Dec. 19, 1944 |
| 2,506,723 | Larsen | May 9, 1950 |